June 6, 1950            H. B. ELLIS            2,510,465

TIMED CYCLE CONTROLLER

Filed June 18, 1946            2 Sheets-Sheet 1

Inventor
Herbert B. Ellis

June 6, 1950  H. B. ELLIS  2,510,465
TIMED CYCLE CONTROLLER
Filed June 18, 1946  2 Sheets-Sheet 2
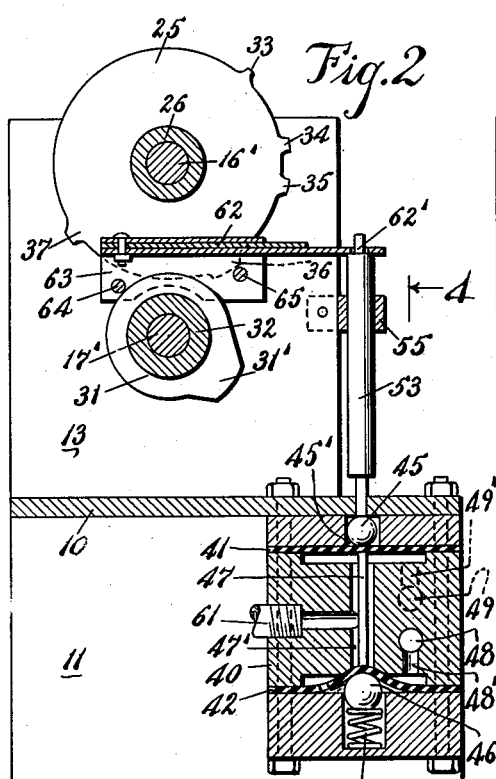
Fig.2
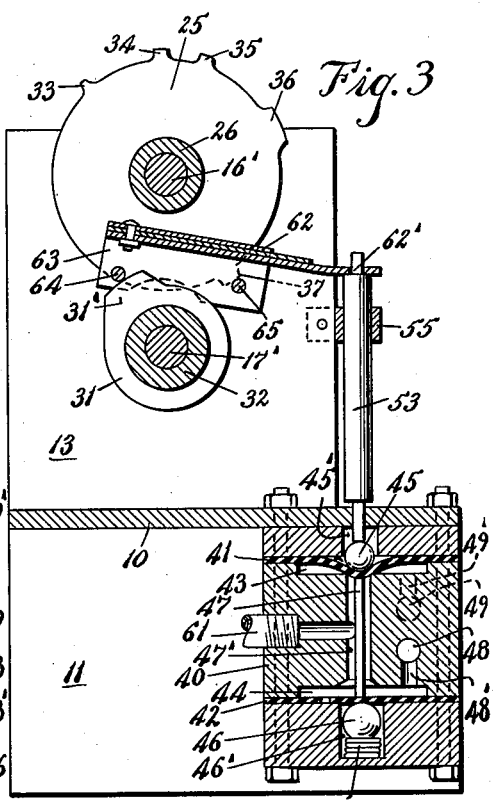
Fig.3
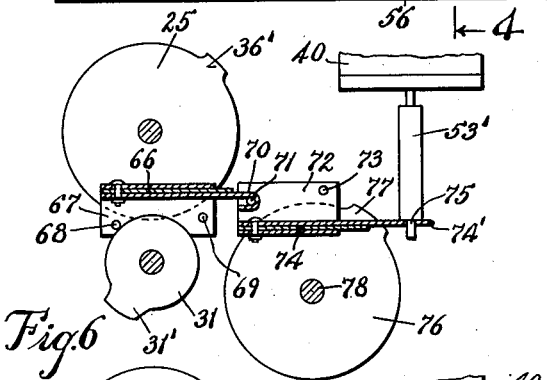
Fig.6
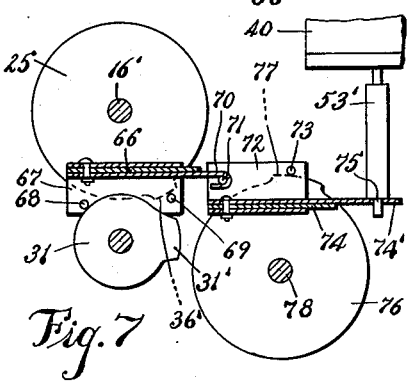
Fig.7
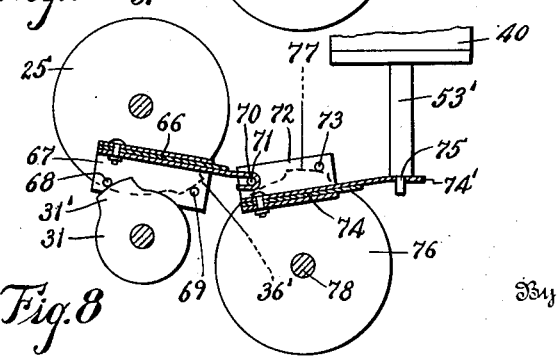
Fig.8
Inventor
Herbert B. Ellis
Attorney Patented June 6, 1950

2,510,465

UNITED STATES PATENT OFFICE 2,510,465

TIMED CYCLE CONTROLLER

Herbert B. Ellis, La Canada, Calif.

Application June 18, 1946, Serial No. 677,632

9 Claims. (Cl. 74—53)

This invention relates to improvements in timed-cycle controllers, and more particularly to a motor driven mechanism by means of which a pre-determined function can be provided for, and automatically performed, at predetermined intervals throughout a long or short period of time, as may be desired.

While my invention can be designed for, and adapted to, most any particular function, to be intermittently performed, I have, for purposes of explanation, illustrated it in an embodiment designed to control sprinkling systems, or irrigating systems, and, as one practical embodiment in this field, I have illustrated it for controlling pressure valves which in turn control sprinkler or irrigating valves.

Among the salient objects of my invention are: to provide in a timed-cycle control mechanism, means mechanically operated which can be arranged to perform a particular function for a definite period of time, as for a number of minutes, one or more times per day, or one or more times per week, or per month, or even for a season, thus making it most valuable for lawn sprinkling, or for irrigating purposes, where such service is to be automatically and periodically performed, without any manual attention whatsoever; to provide in such a timed-cycle control mechanism means whereby it can be expanded to function for long periods of time, as for months, season or yearly, if desired. In other words, I have provided a timed-cycle control-mechanism capable of great capacity in a longer or shorter cycle period, with such intermittent short periods of operation as may be desired.

In order to explain my invention, I have illustrated one embodiment thereof, on the accompanying two sheets of drawings, which I will now describe:

Figure 2 is a vertical sectional view, taken on the line 2—2 of Fig. 1;

Figure 3 is a similar view showing the parts in different positions;

Figure 4 is a vertical sectional view, taken on the section line 4—4 of Fig. 2;

Figure 5 is a plan view of a detail—an actuating member;

Figures 6, 7 and 8 show a modified arrangement of the driven control members, in different positions, for a longer cycle period arrangement.

Figure 1:
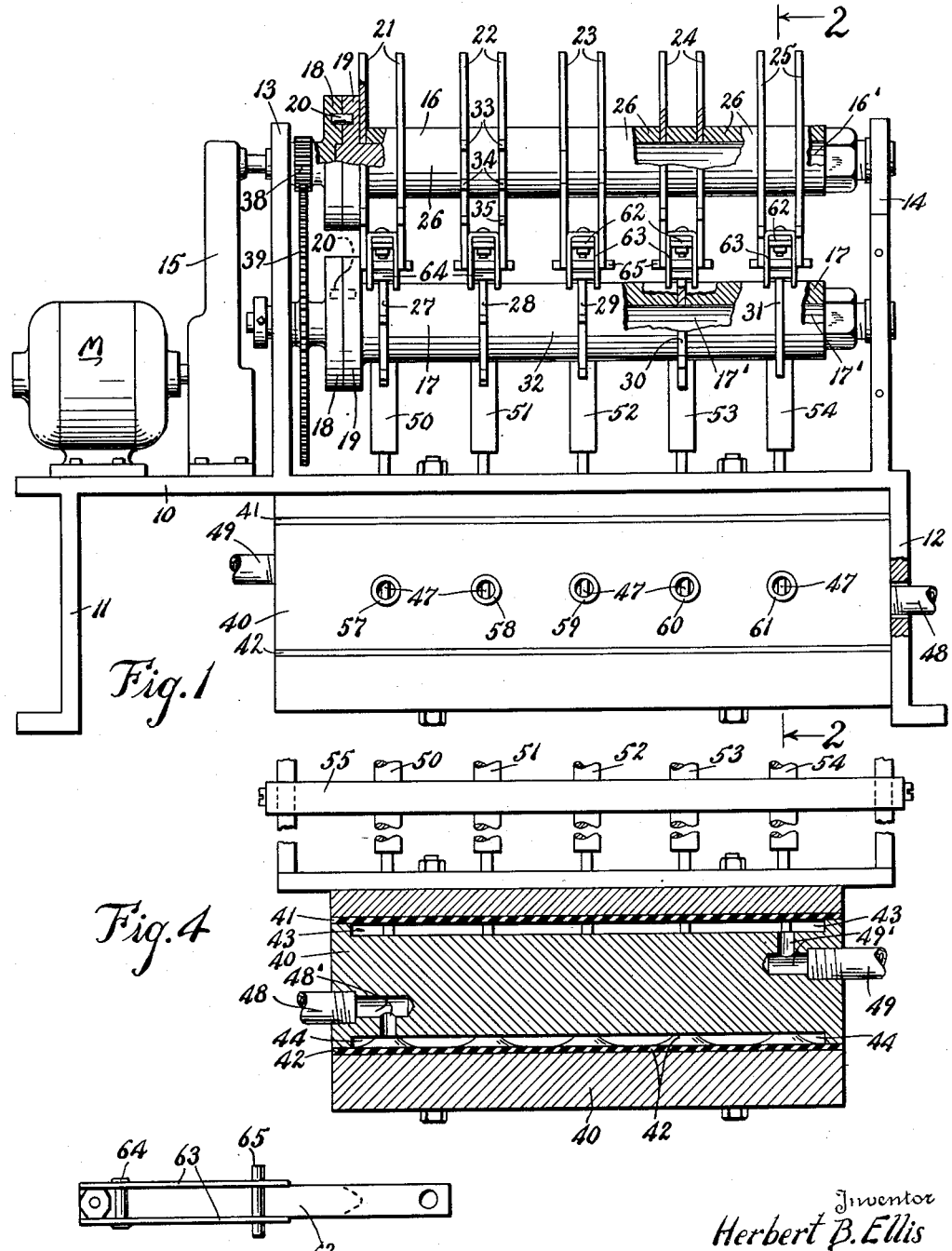
Figure 1 is a side elevation of a timed-cycle control mechanism embodying my invention, as adapted for sprinkler or irrigating systems.

Referring now in detail to the drawings, my invention, as here embodied, for explanatory purposes, is shown mounted upon a supporting table or base 10, with supporting ends 11 and 12, and having on top two end walls, or bearing members 13 and 14, shown in edge view in Fig. 1, and in end view in Figs. 2 and 3.

A motor M is shown mounted on said base 10, with a reduction gear train of well known arrangement, in the vertical case or housing 15. Rotatably supported between said end walls 13 and 14 are two shaft structures, 16 and 17, and each consisting of a shaft, as 16' and 17', having at their driving ends two interlocking heads, as 18 and 19, with interlocking pins, as 20, therebetween, to facilitate assembly.

The upper shaft 16' is provided with a series of pairs of cam discs, as 21, 22, 23, 24 and 25, with spacing and holding spools 26 therebetween, as will be understood from the showing, so that said discs are locked together as a unit to turn with the shaft 16'.

The lower shaft 17' is provided with a series of cam discs, 27, 28, 29, 30 and 31, secured in place with spacing spools, as 32, therebetween. Said cam discs are spaced and so related to the cam discs on the shaft 16' that they operate, one between each pair, as clearly indicated in Fig. 1. The cam discs, on shaft 16', are provided on their edges, or around their peripheries, with cam lugs or portions of different circumferential extent, as 33, 34, 35, 36 and 37, these cams or portions being the same in the present showing on all discs, and those of each pair being arranged in register with or opposite each other, as seen in Fig. 1.

The cam discs 27, 28, 29, 30 and 31 are each provided with a cam lug or portion, designated 27', 28', 29', 30' and 31', respectively.

The upper shaft 16' is provided at one end with a small gear 38, in mesh with a larger gear 39 on shaft 17', all as clearly illustrated in Fig. 1, whereby said shafts are driven from the gear train in the housing 15. It is to be understood, of course, that the gear train can be any desired reduction, and that the cam lugs or portions can be of any desired number, circumferential extent, or spacing, according to the intermittent performance desired, and according to the length of the cycle period or periods desired.

On the underside of said table or base 10, is a plural valve housing, designated 40, extending lengthwise thereunder and having therein, upper and lower diaphragm members 41 and 42, of rubber or other suitable flexible material, covering two chambers 43 and 44, formed in the middle portion of said housing, as will be clear from Figs. 2, 3 and 4. Two ball valves, as 45 and 46, are shown on the outer sides of said diaphragm members 41 and 42, and these ball valves are connected with an operating stem or rod 47, extending through a passageway 47', connecting said chambers 43 and 44, as shown in Figs. 2 and 3, said ball valves being normally confined in two chambers, as 45' and 46', whereby to be moved slightly in opposite directions together to press the diaphragms 41 and 42 into the opposite ends of the passageway 47', and whereby to direct water into or out of said chambers 43 and 44, and again referred to. It will be understood that there is a series of said passageways 47', spaced along the length of said body, with a corresponding series of ball valves and stems, as shown in Figs. 2 and 3. Connected with said housing 40 is a supply pipe 48, Fig. 1, from a source of water supply for directing water into said housing and to said chambers 43 and 44. There is also connected with said housing, at its other end, a drain pipe 49, to provide drainage from said chambers 43 and 44. The supply pipe 48 is connected with the chamber 44, by a bore and port, as at 48', while the drain pipe 49 is connected with the chamber 43, by a bore and port, as 49', as will be understood from Figs. 2, 3 and 4.

Said series of ball valves, with their operating stems, are provided with operating extensions, or members, as 50, 51, 52, 53 and 54, as seen in Figs. 1, 2, 3 and 4, supported in a suitable guide member 55, across one side of said housing 40, as seen in Fig. 4, and in section in Figs. 2 and 3. At the lower ends of said ball valve stems and ball valves are coiled springs, as 56, for normally raising said ball valves and stems, as seen in Fig. 2.

Connected with said main body or housing 40, to be supplied with water under pressure for operating different pressure controlled valves (not shown) is a series of pipe connections, as 57, 58, 59, 60 and 61, as seen in Figs. 1, 2 and 3. These pipes lead to different sprinkler valves at distant locations and are connected to operate pressure valves for different sprinkler valves controlled thereby, whereby said sprinkler valves can be opened to start the sprinkling system.

Mounted between each pair of cam discs, 21 to 25 inclusive, as shown in Fig. 1, and transversely between the upper shaft structure 16 and the lower shaft structure 17, are valve actuating members, designated 62, and shown as composed of a plurality of spring leaves secured together in the top of an arched member 63, as indicated in Fig. 5, and seen in position in Figs. 2 and 3. Each of said arched members 63 has two cross pins, as 64 and 65, the pin 65 in each case being longer and extending beyond the opposite sides 63, as seen clearly in Fig. 5.

Referring to Figs. 2 and 3, one of these valve operating members is shown in two different positions. Each member is free between its pair of discs, in a floating condition, with the outer end of the longest spring leaf fitting over the top of a valve extension, as 62', whereby to press downwardly on said valve extension, as in Fig. 3. In the position shown in Fig. 2, the member 62 is shown at rest. The cam disc 31 is turning counter-clockwise. Its cam portion 31' passes under cross pin 65, and engages under cross pin 64 and said member 62, as seen in Fig. 3. In the meantime, the cam lug 37 has moved over cross pin 65, and forms a bearing therefor so that the lift on pin 64, or pressure on pin 65, forces the end of the springs 62 down on the valve extension 53, as seen in Fig. 3. The timing of the rotation of the cam disc 31, and the rotation of the discs 25, with their spaced cam lugs, can be such that the desired intermittent pressing of the ball valves 45 and 46 can be had.

Referring to Figs. 6, 7 and 8, I have added an additional valve-operating spring member. In Fig. 6, instead of one spring member 62, I have shown a spring member 66, in the arched member 67, with the cross pins 68 and 69, and instead of the spring end being connected with a valve, it is bent to a hook 70, and is shown hooked on to a cross pin 71, in an inverted arched member 72, with the second cross pin 73, and having the leaf springs 74 in its bottom, the longer spring 74' being placed under the end of a valve stem, as at 75, to function with an upward movement, instead of a downward movement, as in Fig. 3.

The spring member 74, in its inverted condition, floats between a pair of discs, as 76, having a cam lug or portion 77, of any desired length circumferentially, and can be driven at any desired speed by shaft 78, from the gear train, before referred to.

Thus, in combination with revolving cam discs, having cam lugs or portions around their peripheries for controlling or causing the predetermined intermittent action, I have provided the operating members, as 62 in Figs. 2 and 3, and 66 and 74 in Figs. 6, 7 and 8, said operating members operating, in the present showing, valve extensions, as 53 and 53', but which can be broadly referred to as functioning members to be moved by the operating members.

*Use and operation*

The use and operation of the invention may be briefly described as follows:

Referring to Figs. 1, 2 and 3, we will assume that the discs 21, 22, 23, 24 and 25 are connected and geared to make one complete revolution every twenty-four hours, and that the discs 27, 28, 29, 30 and 31 are geared to make one complete revolution per week; that the operating member 62 therebetween is held and positioned to be acted upon by the cam lugs or portions on said cam discs 25 and 31, as seen in Figs. 2 and 3. We will also assume that the cam lug or portion 31' on cam disc 31 is of circumferential extent equal approximately to one seventh of the circumference, or one day. It can be made longer or shorter, or more than one cam lug or portion can be formed on said disc, as may be desired for the job to be done. It is also to be understood that the cam lugs or portions 33 to 37 inclusive, on cam discs 25 (and the other discs of the series) can be spaced as may be necessary for the job to be done.

In the showing, cam lug 31', from the position shown in Fig. 2, has moved under the pin 65 on the operating member 62, and has moved under the cam pin 64, where it acts as a support or fulcrum for said pin 64 for, say one day. During this time, as the spaced cam lugs on discs 25 come around to pin 65, as seen in Fig. 3, the operating member will be depressed and the valve mechanism operated to direct water from the supply pipe 48, through chamber 44 and to and out through passage 40 to pipe 61 leading to the pressure valve to be actuated to open a particular sprinkler head. During the time the cam lug 31' is under pin 64, the different cam lugs on discs 25, will actuate said operating member 62 and the actuating member 53, whatever it may actuate. The cam lugs on the discs 25, being of different extents, will hold the operating member down, as in Fig. 3, for the corresponding period and intermittently, according to the lugs or cam portions.

Thus with a cam disc, such as 31, with a cam portion 31', revolving once a week, and cam discs, such as 25, with plural cam portions of different extents and differently spaced, it will be seen that the operating member 62 can be actuated as may be predetermined by said cam portions.

In order to make it possible for the mechanism to function intermittently over a longer period of time, as for a season, or possibly for a year, in Figs. 6, 7 and 8, I have shown an additional cam disc, as 76, with cam lug or portion 77. This cam disc would be geared to make one complete revolution during the predetermined period, whether during the summer months or during a year, as may be desired. This is in addition to the mechanism just described. In this mechanism, the operating member 66, instead of being straight as in Fig. 2, is formed into a hook and connects with another operating member 74, by its pin 71, said latter member 74 being reversed, as before described, and functioning with an upward movement, as indicated in Fig. 8, as the various cam lugs, or portions, are revolved and come into position to act on the pins 68 and 69 on operating member 66, and cam pins 71 and 73 on operating member 74. The positions of the different cam lugs on these Figs. 6, 7 and 8, will indicate how they function. In Fig. 6, cam lug 77, on disc 76 is moving under pin 73, as seen in Fig. 7, and will remain thereunder for such period as the extent of the cam lug 77 determines. As cam discs 25 and 31 function, as before described and as seen in Fig. 8, operating member 66 will be operated to operate the operating member 74, as indicated to actuate the functioning member 53' with an upward movement, instead of a downward movement as in Figs. 2 and 3. It will be evident that the cam lugs or portions on the cam discs 76, 31 and 25 can be arranged as may be desired for predetermining just how long, and how often, and over what extended period of time the mechanism will automatically function, whether for a sprinkling, or an irrigating system, or for some other function which it is desired to have performed intermittently and over a predetermined period of time.

I do not, therefore, limit my invention to the particular details of construction and arrangement shown for explanatory purposes, or to the number or extent of the cam lugs or portions on the different cam discs, or to the specific form of operating member shown, this mechanism being for illustrative purposes, but what I claim as my invention is the following.

I claim:

1. In a timed cycle controller a disc having cam lugs around its periphery, a cooperating disc having a cam lug on its edge, an operating member movably interposed between said discs to be intermittently actuated by said cam lugs, means for driving said discs at predetermined speeds, the cam lug on one disc intermittently forming a fulcrum for said operating member and the cam lugs on the other disc intermittently engaging and moving said operating member.

2. In a timed cycle controller: a disc having cam lugs around its periphery, a cooperating disc having a cam lug on its edge, an operating member movably interposed between said discs to be intermittently actuated by said cam lugs, means for driving said cam discs at different speeds, whereby the cam lug on one disc intermittently forms a fulcrum for said operating member, and the cam lugs on the other disc successively engage and move said operating member.

3. In a mechanism of the character referred to, parallel shafts having cam discs thereon, said cam discs having cam lugs around their peripheries, an operating member between said shafts and transversely thereof, said operating member having spaced portions thereon to be engaged by said cam lugs at opposite sides, whereby one lug functions as a fulcrum for said operating member and the other cam lugs successively engage said operating member to intermittently move it in its functioning action, and a functioning member connected with and moved by said operating member.

4. In a mechanism of the character referred to, a pair of parallel shafts geared together to be driven at different speeds, cooperating cam discs on said shafts, said cam discs having on their peripheries cam lugs, an operating member movably held between said shafts, transversely thereof and having spaced portions to be engaged by said cam lugs from opposite sides, whereby one lug functions as a fulcrum for said operating member, and the cam lugs on the other disc successively engaging said operating member and moving it on its fulcrum, and a functioning member connected with and moved by said operating member.

5. In a mechanism of the character referred to, in combination: two parallel shafts with means for driving them at different speeds, said shafts each having a disc with a cam portion on its edge, an operating member movably supported between said discs, transversely of said shafts, and having thereon spaced portions to be engaged by said cam portions for operatively moving said operating member, one of said cam portions functioning as a fulcrum for said operating member and the other cam portion engaging and moving said operating member operatively on said fulcrum.

6. In a mechanism of the character referred to, in combination: two parallel shafts, means for driving them at different predetermined speeds, one of said shafts having thereon a pair of spaced discs having cam portions on their edges, the other shaft having thereon a disc positioned to move between said pair of discs on said first shaft and having a cam portion on its edge, an operating member supported transversely between said shafts and between the pairs of spaced discs and having thereon portions to be engaged by the cam portions on all of said discs for operatively moving said operating member.

7. In a mechanism of the character referred to, in combination: two parallel shafts, means for driving them at different predetermined speeds, one of said shafts having thereon a pair of spaced discs having cam portions spaced around their edges to function in pairs, the other shaft having a disc positioned between the pair of discs on said first shaft and having on its edge a cam portion of predetermined circumferential extent, an operating member supported transversely between said shafts and between the pair of spaced discs on one shaft and having portions to be engaged by said cam portions on all of said discs to functionally move said operating member.

8. In a mechanism of the character referred to, in combination: two shafts, means for driving them at different predetermined speeds, one of said shafts having therein a plurality of pairs of cam discs, said cam discs having cam portions around their edges, the cam portions of each pair being opposite each other, the other shaft having thereon a plurality of cam discs positioned one between each pair of cam discs on said first shaft and having cam portions on their edges, an operating member movably supported between each pair of cam discs on one shaft with its operating end extended outwardly from between said pair of discs and said shafts, said operating member having longitudinally spaced cam-engaging elements thereon to be engaged by the cam portions on each pair of cam discs and the cam disc therebetween for operatively moving said operating member, and a functioning member to be operated by said operating member.

9. In a mechanism of the character referred to, in combination: two shafts, means for driving them at different predetermined speeds, one of said shafts having thereon a plurality of pairs of spaced cam discs having cam portions spaced around their edges, the cam portions of each pair being opposite each other, the other shaft having thereon a plurality of cam discs positioned one between each pair of cam discs on said first shaft and having cam portions on their edges of circumferential extent, an operating member of U-shape in cross section and having a flexible, transversely extending operating portion between said shafts, the U-shaped body portion of each operating member being held one between each pair of cam discs, cam-engaging pins across said U-shaped body portion, positioned to be engaged by the cam portions on said cam discs, from opposite sides, whereby to operatively move said operating member, and a functioning member connected for actuation by said flexible, transversely extending operating portion of said operating member.

HERBERT B. ELLIS.

REFERENCES CITED

The following references are of record in the file of this patent:

UNITED STATES PATENTS

| Number | Name | Date |
|---|---|---|
| 1,312,328 | Johannson | Aug. 5, 1919 |
| 1,408,781 | Sewell | Mar. 17, 1922 |
| 1,624,269 | Marchetti | Apr. 12, 1927 |
| 1,745,707 | Perett | Feb. 4, 1930 |
| 2,169,039 | Defandorf et al. | Aug. 8, 1939 |
| 2,240,163 | Pick | Apr. 29, 1941 |
| 2,437,401 | Nilson | Mar. 9, 1948 |

FOREIGN PATENTS

| Number | Country | Date |
|---|---|---|
| 264,396 | Great Britain | 1927 |